United States Patent [19]

Helms et al.

[11] Patent Number: 5,225,747
[45] Date of Patent: Jul. 6, 1993

[54] SINGLE-BUTTON ACTUATED SELF-CORRECTING AUTOMATIC CONVERTIBLE TOP

[75] Inventors: James M. Helms, Southgate; George A. Alderton, IV, Royal Oak, both of Mich.

[73] Assignee: ASC Incorporated, Southgate, Mich.

[21] Appl. No.: 817,299

[22] Filed: Jan. 6, 1992

[51] Int. Cl.⁵ .............................. B60J 7/08
[52] U.S. Cl. ................. 318/265; 318/286; 318/467; 296/107
[58] Field of Search .......... 318/560, 652, 663, 264, 318/265, 266, 286, 466, 467, 468, 470, 483; 296/107, 108, 112, 115, 117, 223

[56] References Cited

U.S. PATENT DOCUMENTS

| | | | |
|---|---|---|---|
| 2,105,293 | 1/1938 | Paulin | 296/107 |
| 2,617,972 | 11/1952 | Nutter | 318/483 |
| 2,640,958 | 6/1953 | Davis | 318/470 |
| 2,731,588 | 1/1956 | McLeod | 318/483 |
| 2,753,508 | 7/1956 | Inman | 318/483 |
| 2,939,742 | 6/1960 | Dardarian et al. | 296/107 |
| 4,408,146 | 10/1983 | Beckerman | 318/264 |
| 4,749,193 | 6/1988 | Hacker | 296/107 |
| 4,766,356 | 8/1988 | Handa et al. | 318/55 |
| 4,776,630 | 10/1988 | Fuketomi et al. | 296/107 |
| 4,852,469 | 8/1989 | Chuang | 318/266 X |
| 4,895,409 | 1/1990 | Komishi et al. | 296/107 |
| 5,042,868 | 8/1991 | Nothaft et al. | 296/107 |
| 5,054,686 | 10/1991 | Chuang | 236/49.3 |
| 5,067,768 | 11/1991 | Fischbach | 296/107 |

Primary Examiner—Bentsu Ro
Attorney, Agent, or Firm—Harness, Dickey & Pierce

[57] ABSTRACT

A system for lowering and raising an automotive convertible top includes a motor for moving the convertible top, a potentiometer for sensing the position of the convertible top throughout its range of movement, and a controller for actuating the motor in response to the sensed position of the potentiometer.

23 Claims, 4 Drawing Sheets

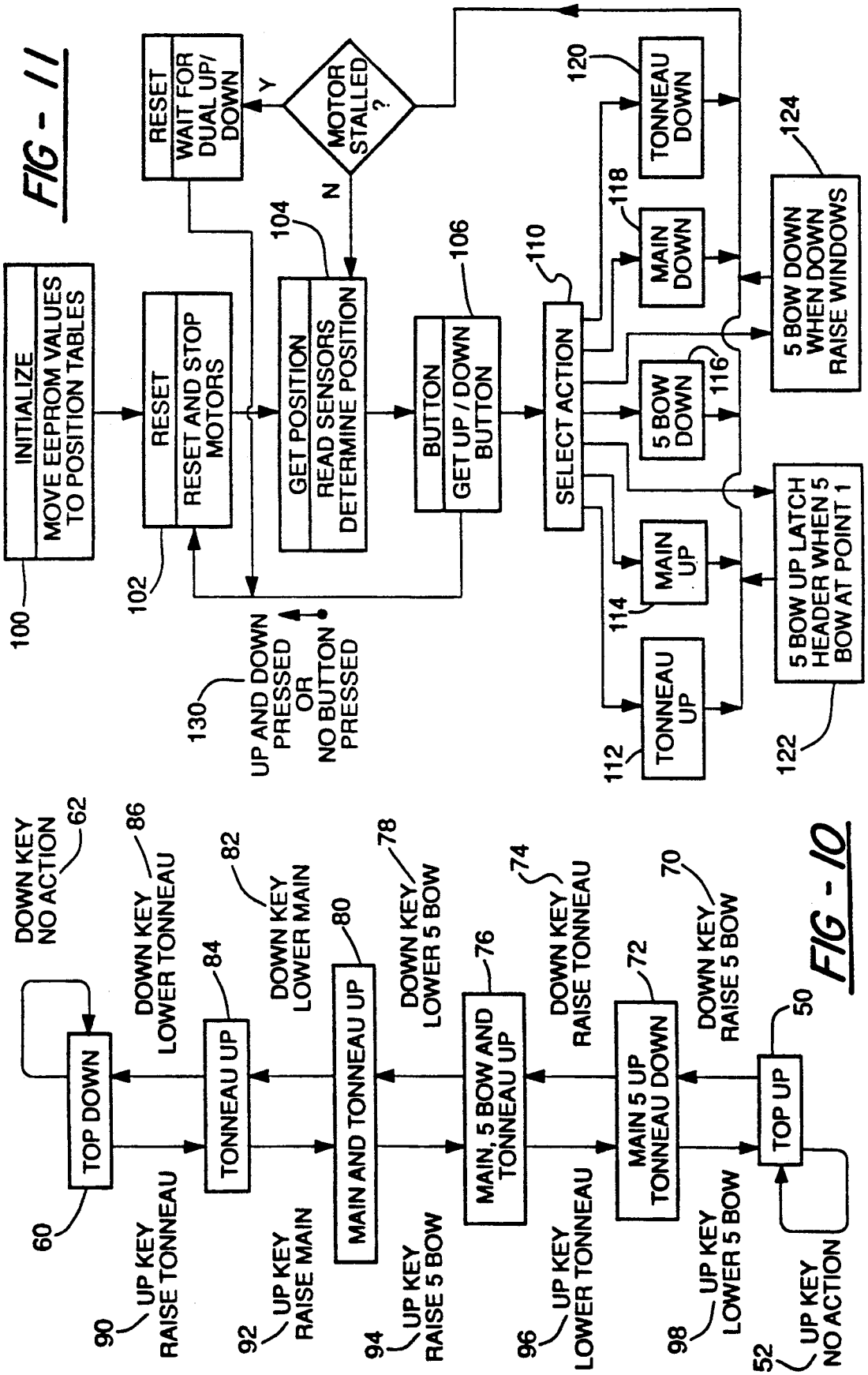

SINGLE-BUTTON ACTUATED SELF-CORRECTING AUTOMATIC CONVERTIBLE TOP

BACKGROUND OF THE INVENTION

1. Scope of the Invention

This invention relates generally to automobile convertible tops, and more particularly to an automobile convertible top that can be opened and closed automatically.

2. Description of the Related Art

In the field of automobile design, convertible tops have been employed to provide the consumer with versatile styling. Most people are familiar with manual convertible tops, which are latched and lowered by hand. However, over the years, many different types of automatic and semi-automatic convertible tops have been developed. Generally, these convertible tops utilize one or more motors to move the various linkages and other movable elements from an extended (or top closed) position to a retracted (top open) position. Through the aid of motorized movement, the user can raise and lower the convertible top more easily.

However, simply providing for motorized movement of the convertible top is not enough. For example, there are known motorized convertible tops that provide for limit sensors on the elements to determine whether the elements are in the "full retracted" or "full extended" position. However, such systems provide no information as to whether the linkage elements are simply near, rather than being at, one of the two fully articulated positions or not. As a result, these known systems, while being capable of causing the convertible top to be opened and closed automatically, require each sensed element to reach an extreme position before commencing the movement of the next element in the sequence necessary to accomplish the desired movement of the convertible top. Thus, it would be advantageous if a motorized convertible top system could allow simultaneous movement of various elements so as to accomplish the opening and closing of the convertible top using a series of movements that are more fluid and continuous and that both reduce the time necessary to accomplish the movements as well as improving the aesthetic appearance of the movements.

Another disadvantage of known motorized convertible tops is the fact that the elements may bind as the movements are sequenced, increasing the load on the motors and risking damage to the motors or elements as the motors try to "force" the elements to move. Especially when trying to accomplish simultaneous movement of multiple elements, the fact that one element may be slightly inhibited in its movement means that the other moving elements will reach their desired position sooner than will the binding element. Allowed to continue uncorrected, this misalignment of elements can result in the convertible top being cocked in an undesirable position and may cause damage to the convertible top mechanism. Therefore, it would be desirable if there were some way to monitor the movement of critical elements while they are moving simultaneously so that remedial action can be taken in the event that a misalignment situation arises. The remedial action could include stopping the movement of other elements while the binding element is still moved, allowing the slower, binding element to "catch up" with the other elements. The remedial action could also include reversing the movement of some elements in order to realign the convertible top, and, once realignment is achieved, resuming normal movement of the elements. The remedial action could also include detecting an unrecoverable misalignment and shutting down the motors before the motors are overburdened.

SUMMARY OF THE INVENTION

It is therefore an object of the present invention to provide a system and method for lowering and raising an automobile convertible top where motive means, such as electric motors, move the various structural elements of the convertible top. Sensors are associated with the convertible top's structural elements whereby the system determines the instantaneous position of the various structural elements as they are moved and commands further movement based upon the sensed positions of the elements. One advantage of the present invention is that the structural elements can be moved simultaneously to achieve a more fluid sequence of movements and to decrease the amount of time it takes to extend and retract the convertible top.

Another advantage is that, because the instantaneous positions of the various structural elements are being monitored, the system and method are capable of instituting remedial action in the event that the structural elements become misaligned during the sequence of movements. A further important feature of the presently preferred embodiment is that the monitoring of the convertible top's structural elements is accomplished through the use of only a few sensors, thereby simplifying the assembly of the system and reducing the cost associated therewith. Another feature of the presently preferred embodiment is that the system and method are capable of diagnosing failures within the system, and generating failure indications, whereby the automobile owner or a qualified service person can interpret the error information and perform the necessary repairs.

BRIEF DESCRIPTION OF THE DRAWINGS

Other objects, features and advantages of the present invention will become more apparent after understanding the following description of the presently preferred embodiment in conjunction with the drawings in which:

FIGS. 10 and 11 are flow charts depicting the control methodology employed to ensure proper sequencing of the various structural elements as the convertible top is retracted and extended.

DETAILED DESCRIPTION OF THE PRESENTLY PREFERRED EMBODIMENT

Figure 1:
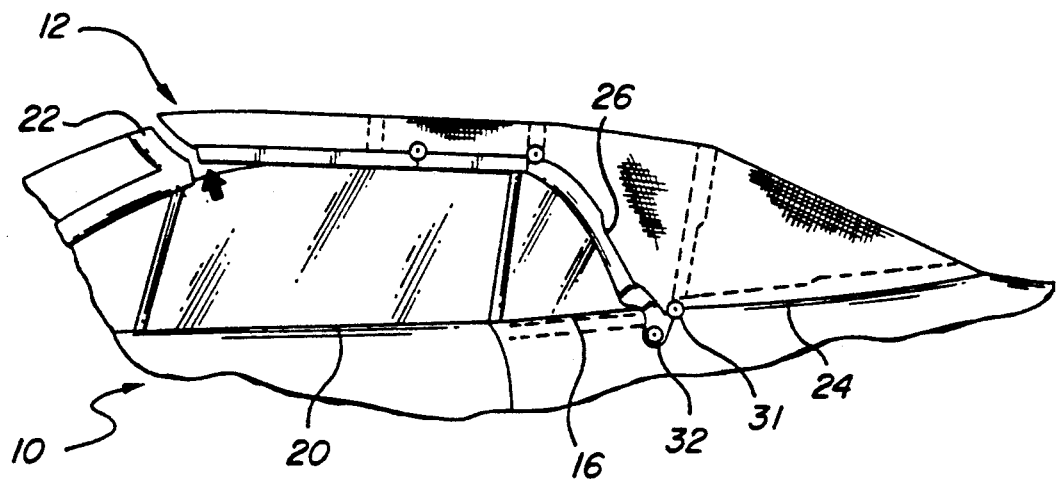
FIGS. 1 through 8 are diagrams illustrating the movement of the elements of the convertible top as it is retracted and extended.

As illustrated in FIGS. 1 through 8, the present invention is directed toward a mechanism which can automatically raise and lower an automobile convertible top. As can be appreciated by those of ordinary skill in the art, while each different type of automobile requires a different convertible top suited to the particular vehicle, the concepts disclosed herein are equally applicable to a wide variety of configurations. In the presently preferred embodiment, the vehicle 10 has a convertible top 12 which is stored in a compartment beneath a tonneau cover 14, and a rear quarter window 16. Generally, the tonneau cover 14 must be raised, and the rear quarter windows 16 must be lowered before the convertible top 12 is lowered or raised. This insures that the top 12 will be properly stored in the compartment beneath the tonneau cover 14 and also insures that the rear quarter windows 16 are clear of the top 12 as it moves, thereby preventing damage.

More particularly, the lowering, or retracting, of the convertible top occurs in the following manner. First, as shown in FIG. 1, the top 12 is unlatched from the header 22. In this embodiment, screw motors unhook J-hooks latched to the header 22 such as disclosed in assignee's issued U.S. Pat. No. 5,058,939, the disclosure of which is hereby incorporated herein by reference. However, it will be appreciated that other forms of latches could be used. Additionally, the latches could be manual, with conventional sensors to indicate whether the person operating the car has yet unlatched the latches. Once the latches are unlatched, the rest of the movements necessary to lower the top 12 can commence.

Figure 2:
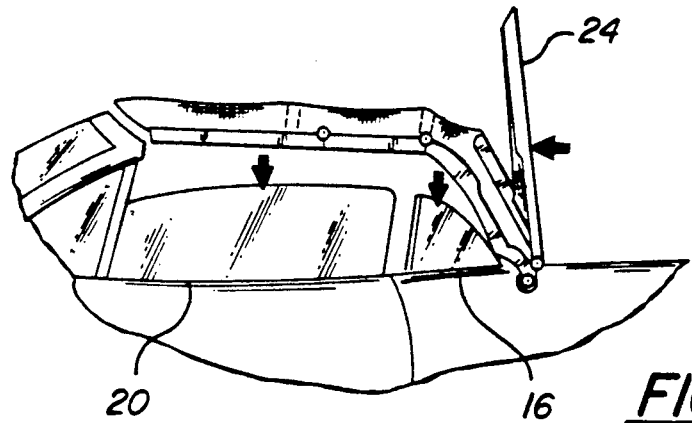
Figure 3:
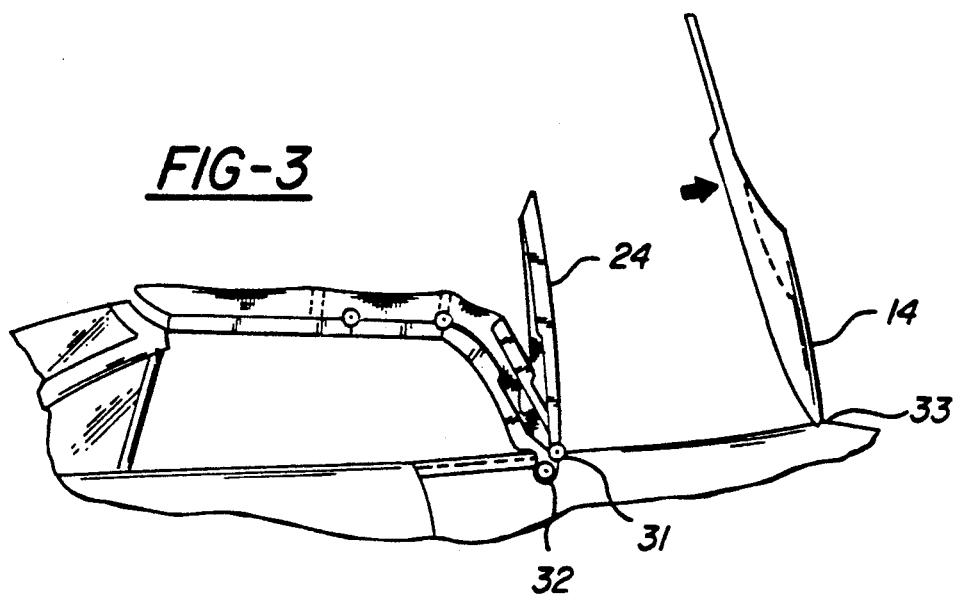
Figure 4:
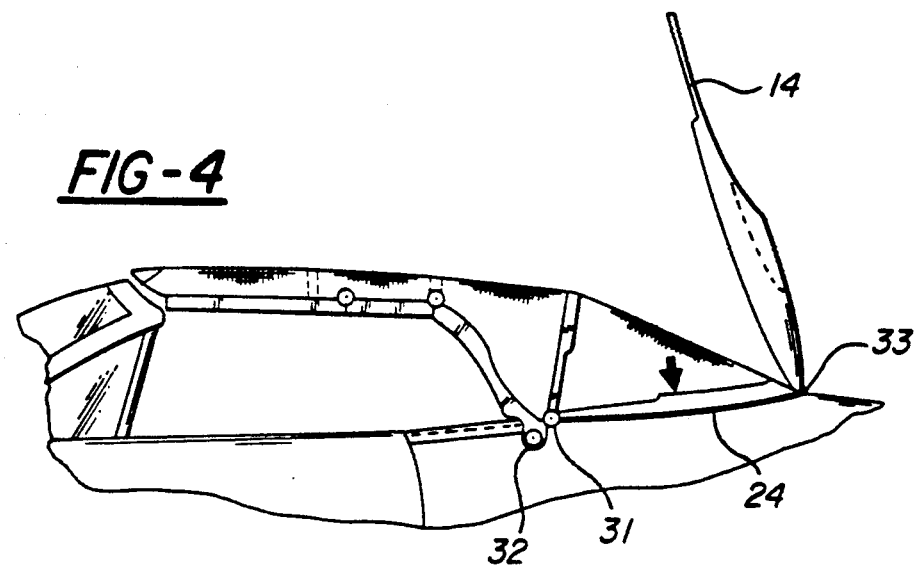
Figure 5:
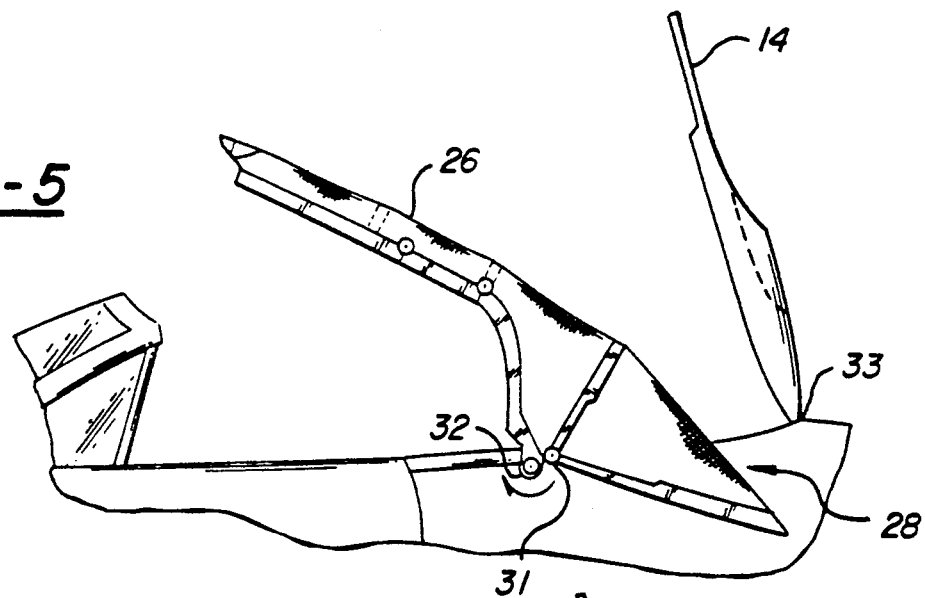
Figure 6:
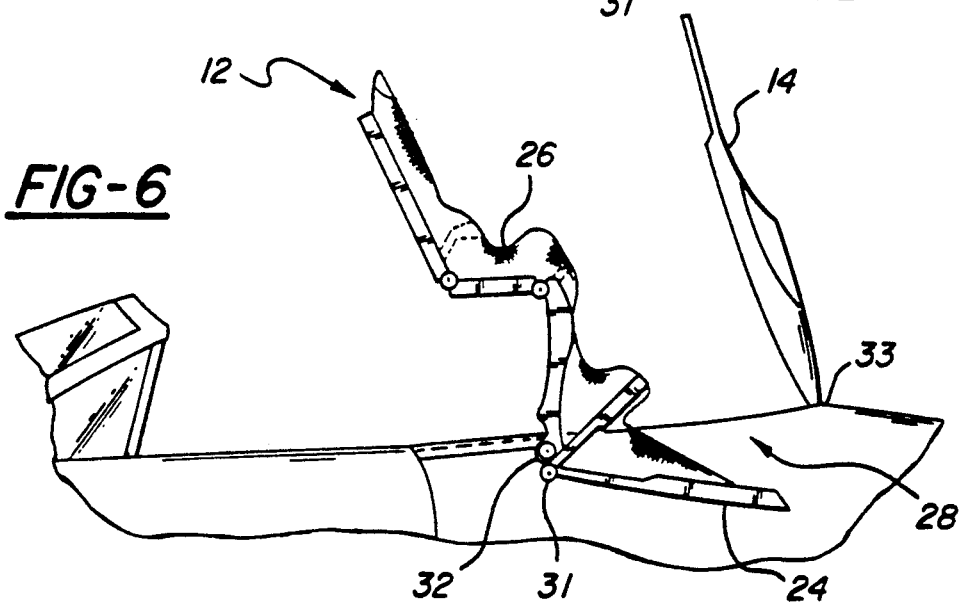
Figure 7:
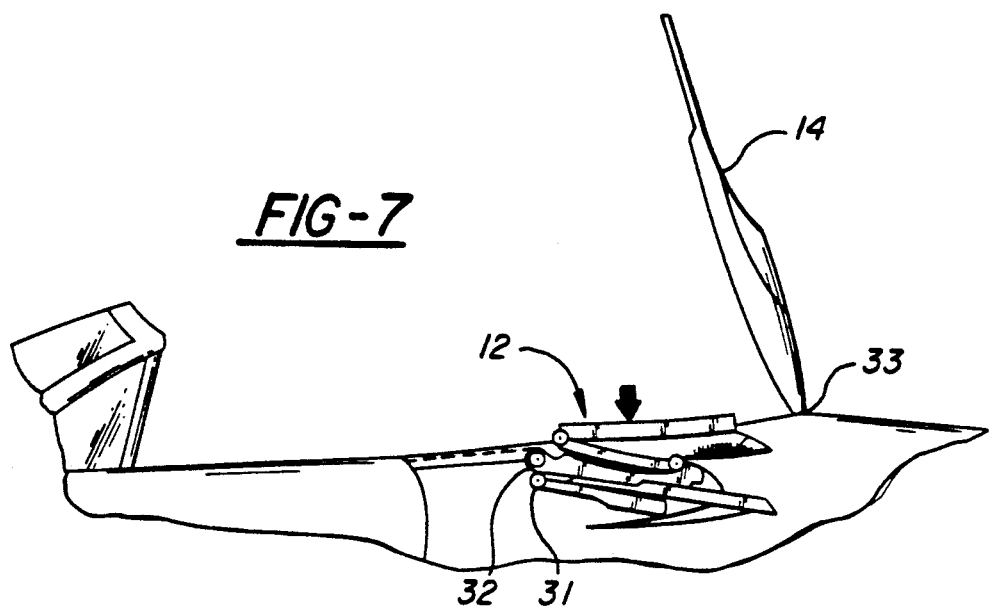
Figure 8:
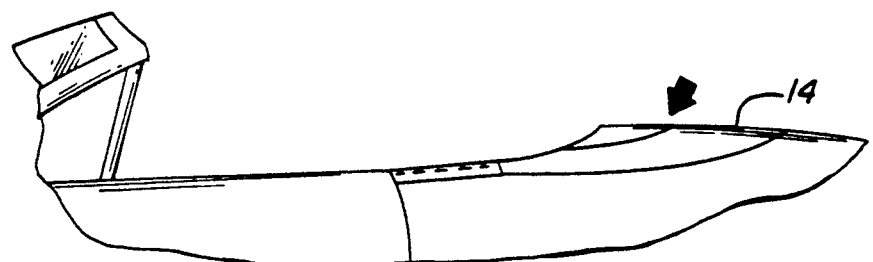

The next movement in the sequence, shown in FIG. 2, is the raising of the #5 bow 24 so the tonneau cover 14 can be raised, and the lowering of the forward side windows 20 and rear quarter windows 16. The forward side windows 20 are lowered and the rear quarter windows 16 are lowered to allow the top to move freely without worry of damaging the windows 16, 20. Once the #5 bow 24 reaches a position clear of the sweep path of the tonneau cover 14, the tonneau cover begins raising, shown in FIG. 3. Next, once the tonneau cover 14 reaches a position clear of the sweep path of the #5 bow 24, the #5 bow lowers, as shown in FIG. 4, and the main portion of the convertible top 26 begins lowering into the compartment 28 beneath the tonneau cover 14, as shown in FIGS. 5-7. Finally, once the top is fully retracted into the compartment 28, as shown in FIG. 7, the tonneau cover 14 is lowered to cover the compartment 28, as shown in FIG. 8. To raise, or extend, the convertible top 12, the sequence of movements are simply reversed. The linkages per se and the motors used can be of conventional design, such as disclosed in U.S. Pat. Nos. 3,180,675 and 3,312,058.

Figure 9:
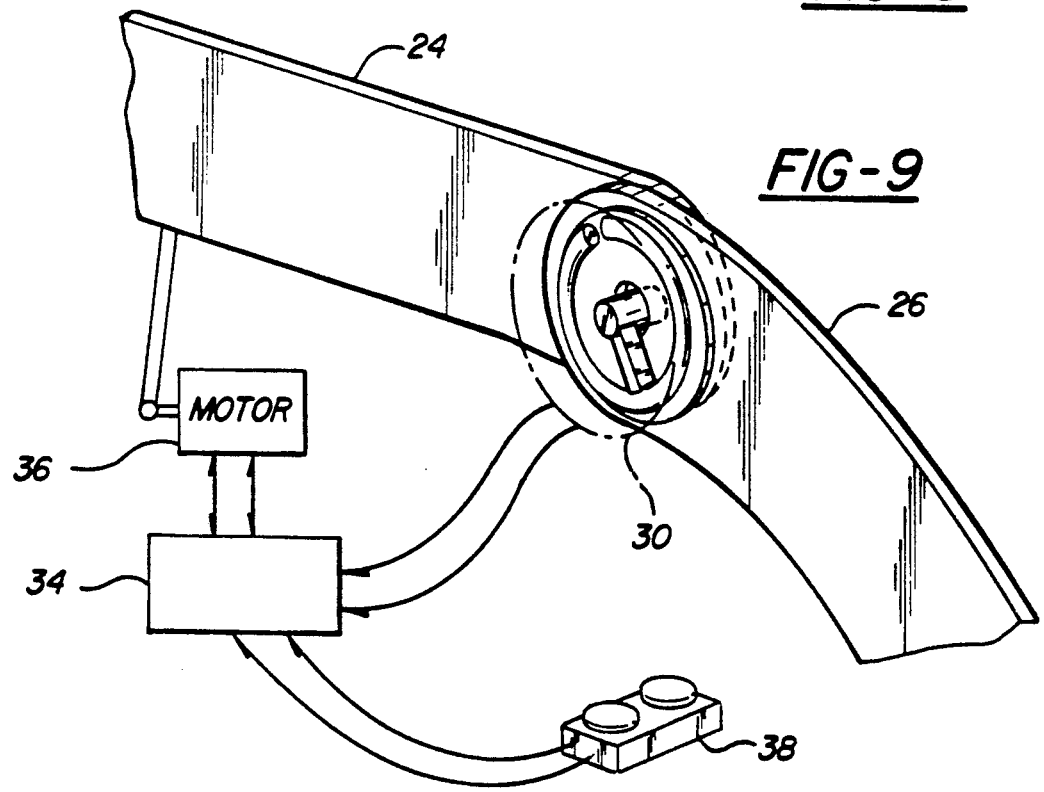
FIG. 9 is a functional diagram detailing the relationship between the motor, sensor, structural element and controller at one particular pivot point in the convertible top mechanism.

In order to provide the unique control of this invention of the various elements, such as the latches, #5 bow 24, tonneau cover 14 and main 26, a unique arrangement of sensors is provided. As illustrated in FIG. 9, each sensor in the preferred embodiment takes the form of a rotary variable resistance device or potentiometer 30 mounted at the pivot point of a pair of elements or links (to sense the relative position of one link with respect to the other) or a pivot point between a link and the vehicle's chassis (to sense the relative position of the link with respect to the chassis. It will be appreciated that sensors are provided at each critical pivot point in the mechanism, and applicants have discovered that only three sensors are required to achieve full control of the top. The three points of relative movement requiring sensing are the position of the #5 bow 24 with respect to the main 26, the position of the main 26 with respect to the vehicle chassis, or body, and the position of the tonneau cover 14 with respect to the vehicle body. The position sensors are mounted at these three critical pivot point 31, 32 and 33. For example, as detailed in FIG. 9, the sensor provided at the pivot point 31 of the #5 bow 24 is shown diagramatically in greater detail. Here it can be seen how the potentiometer 30 measures the relative position between the #5 bow 24 and the main 26. The pivot point sensors are electrically connected to the controller 34 which monitors the positional information provided by the sensors (i.e. voltage or amperage) and, in response to these signals, commands the movement of the convertible top 12. In this embodiment, cantilevered DC motors move the various elements, although it should be appreciated that other motive means could be utilized, such as, for example, hydraulic pumps. In order to move the tonneau cover 14, #5 bow 24 and main top linkage 26, the movement of the DC motors is governed by the controller 34. As illustrated, the #5 bow motor 36 raises and lowers the #5 bow 24, and the #5 bow potentiometer 30 measures the relative angular position of the #5 bow 24 with respect to the main 26. In response to the detected position of the #5 bow, as well as the positions of the other elements, the controller 34 issues commands to the #5 bow motor 36 to raise or lower the #5 bow 24 as needed. The other motors are similarly controlled.

The interaction of the controller 34, DC motors and sensors can be better understood by referencing the flow charts of FIGS. 10 and 11. The controller 34 is powered by the vehicle's electrical system, and includes driver circuits for providing current to the motors, A/D converters for sensing the stall condition of the motors and for receiving the instantaneous positional information provided by the potentiometers, and command input lines for receiving and interpreting the "top up" or "top down" signals issued by the automobile driver through the up/down switches 38, all of which are interfaced to a microprocessor. It can be appreciated by those of ordinary skill in the art that the electronics and circuitry comprising the controller 34 can take a variety of forms, however the microprocessor, converters and drivers selected for this embodiment provide a convenient means by which to execute the invention.

In this embodiment, the controller 34 monitors the linkage element positional information provided by the sensors to determine the instantaneous position of the linkage elements. The controller 34 also monitors for a stall condition at the motors to determine if a motor is being unduly loaded, such as would occur if the linkage being driven by the motor were jammed. Within the logic circuitry of the microprocessor of the controller 34 are instructions for interpretting the monitored information and for directing current to the motors to drive the motors in accordance with the action desired by the automobile driver.

In this embodiment, the driver is provided with "up" and "down" buttons located on the dashboard. These directional control buttons 38 are electrically linked to the controller 34 and determine which sequence of movements of the convertible top 12 are desired. As shown in FIG. 10, the general control system logic progresses in the following manner. If the driver presses the "up" button and the top 12 is already fully raised, no action is taken, as indicated by function block 50 and action nmemonic 52. Similarly, if the "down" button is pressed while the top 12 is fully lowered, no action is taken 60, 62. However, the normal course of events would be that the "down" button is pressed when the top 12 is up, and the "up" button pressed when the top 12 is down.

It should be noted that, in this embodiment, the driver must continue to depress the "down" button for the top 12 to continue moving down, and must continue pressing the "up" button for the top to continue moving up. When the top is up 50 and the "down" button is pressed, the controller 34 senses the directional command desired by the driver and begins initiating the sequence of movements necessary to lower the top 12. First, the J-hooks are unlatched, the windows lowered and the #5 bow 24 is raised 70 until the positional sensors indicate that the #5 bow is in the up position and the tonneau cover is in the down position 72. Provided the "down" button is still being depressed, the next action is to raise the tonneau cover 74. The positional information provided by the sensors should then be that the #5 bow, main and tonneau cover are in the up position 76. Now that the tonneau cover is clear, the #5 bow is lowered 78, leaving the main and tonneau cover up 80. Next, the main is lowered 82, leaving only the tonneau cover in the up position 84. Finally, the tonneau cover is lowered and the windows raised 86, completing the lowering 60 of the covertible top 12.

To raise the convertible top 12, the controller senses the "up" command issued by the automobile driver and begins the sequence of actions necessary for raising the top 12. First, the tonneau cover is raised and windows lowered 90, leaving the main and #5 bow in the down position but the tonneau cover in the up position 84. Once the tonneau cover is clear, the main is raised 92 so that both the tonneau cover and main are in the up position 80. Next, the #5 bow is raised 94 so that all elements are in the up position 76. Once the #5 bow is clear of the sweep path, the tonneau cover is lowered 96, leaving the main and #5 up 72. Finally, the #5 bow lowered, the J-hooks latched and the windows raised 98, completing the sequence of motions necessary to raise the top.

As shown in FIG. 11, the actual logic process includes initializing the controller upon power-up 100 and resetting the logic control sequence 102. Next, the controller reads the position sensor and directional command switch information 104 and determines the position of the linkage elements with respect to the directional command desired 106. Based upon this information, the proper movement in the sequence of movements is selected 110 and commanded 112-124. It can be appreciated from this diagram that while each given motion sequence is executed 112-124, the controller returns to the beginning of the control logic sequence and reassesses the positional and direction information 104, 106 in order to determine 110 the next desired motion 112-124.

In practice, the control logic progresses as described in conjunction with FIG. 10, with the additional features of detecting improper linkage positioning and/or excessive motor loading, and selects the motion sequence 112-124 necessary to remedy the situation. Thus, for example, if the controller 34 is currently commanding the tonneau cover to raise 112 and a stall condition is detected at the motor driving the tonneau cover, the controller stops the motor 102 and reassesses the positional information 104 to determine if the another action is required. Similarly, in the event that the tonneau cover is being raised 112 but the #5 bow slips into the path of the tonneau cover, the positional information 104 will reveal this potentially damaging situation and initiate the raising of the #5 bow to insure the tonneau cover has proper clearance to move. Finally, in the event that an unrecoverable error occurs, the up and down buttons can be depressed simultaneously 130 to reset the system. Upon resetting, qualified service personnel can access the controller 34 and receive error information such as whether one of the sensors has become grounded or shorted or whether one of the motors is experiencing difficulty. Thus, service can be provided more quickly and cheaply because the convertible top system is self-diagnosing.

The foregoing description of the presently preferred embodiment has been provided for the purposes of illustration. Therefore, one of ordinary skill in the art can appreciate that modifications could be made without departing from the spirit or scope of the invention disclosed herein.

We claim:

1. A system for lowering and raising an automotive convertible top, said system comprising:
    motive means connected to said convertible top for moving said convertible top to open and close the convertible top;
    position sensing means connected to said convertible top for sensing the position of said convertible top throughout its range of motion; and
    control means, responsive to said position sensing means, for actuating said motive means in response to input from said position sensing means.

2. The system of claim 1 wherein said convertible top is rigid.

3. The system of claim 1 wherein said convertible top is comprised of a plurality of articulable structural elements forming an articulable support structure over which a flexible top is mounted.

4. The system of claim 3 wherein said motive means associated with said convertible top moves said articulable elements to open and close said convertible top.

5. The system of claim 4 wherein said position sensing means senses the instantaneous position of at least one of said articulable elements throughout its range of motion.

6. A system for retracting and extending an automotive convertible top comprised of a plurality of articulating structural elements over which a cover is supported where the convertible top, when fully retracted, is stored beneath a tonneau cover pivotally attached to the automobile, the system comprising:
    motive means, connected to said articulating structural elements and said tonneau cover, for moving said articulating structural elements and said tonneau cover to retract and extend the convertible top;
    position sensing means, connected to said articulating structural elements and said tonneau cover, for sensing the instantaneous positions of said articulating structural elements and said tonneau cover throughout their range of movement; and
    control means, responsive to said position sensing means, for controlling the movements of said motive means based upon said sensed instantaneous positions of said articulating structural elements and said tonneau cover.

7. A method for retracting and extending an automotive convertible top, the method including:
    sensing a command, issued by an automobile user, to retract or extend the convertible top;
    initiating movement of said convertible top in accordance with said sensed command; and monitoring the instantaneous position of said convertible top as it moves to ensure said convertible top is moving properly.

8. The method of claim 7 further including the steps of:
  initiating the movement of a tonneau cover in conjunction with said initiation of movement of said convertible top; and
  monitoring the instantaneous positions of said tonneau cover and said convertible top as they move to ensure said tonneau cover and said convertible top are moving properly.

9. The method of claim 7 wherein said convertible top has at least one pivot point and wherein the instantaneous position of said convertible top is measured and monitored at said pivot point.

10. The method of claim 9 further including the step of initiating remedial action when said monitored instantaneous position of said convertible top indicates said top is not moving properly.

11. The method of claim 10 wherein said remedial action includes:
  initiating movement of said convertible top to correct said indicated improper movement; and
  ceasing movement of said convertible top if said improper movement cannot be corrected.

12. The method of claim 7 wherein said convertible top comprises an articulating support structure over which a flexible cover is supported, said articulating support structure having a plurality of pivotally linked structural elements and wherein the instantaneous position of said convertible top is determined by determining the instantaneous position of at least one of said structural elements as measured at the structural element's pivot point.

13. A method for retracting and extending an automotive convertible top pivotally attached to the automobile, the method including:
  sensing a command, issued by an automobile user, to retract or extend the convertible top;
  initiating movement of said convertible top in accordance with said sensed command;
  monitoring the instantaneous position of said convertible top as it moves to ensure said convertible top is moving properly; and
  initiating remedial movement of said convertible top in the event that said monitored instantaneous positions indicate that said convertible top is not moving properly.

14. A system for retracting and extending an automotive convertible top where the convertible top, when fully retracted, is stored beneath a tonneau cover pivotally attached to the automobile, the system comprising:
  motive means, connected to said convertible top and said tonneau cover, for moving said convertible top and said tonneau cover to retract and extend the convertible top;
  position sensing means, connected to said convertible top and said tonneau cover, for sensing the instantaneous positions of said convertible top and said tonneau cover; and
  control means, responsive to said position sensing means for controlling the movements of said motive means based upon said sensed instantaneous positions of said convertible top and said tonneau cover.

15. The system of claim 14 wherein said convertible top is rigid.

16. The system of claim 14 wherein said convertible top is comprised of a plurality of articulating structural elements over which a flexible cover is supported.

17. The system of claim 16 wherein said motive means moves said articulating structural elements and said tonneau cover to retract and extend said convertible top.

18. The system of claim 16 wherein said position sensing means indicates the instantaneous position of at least one of said articulating structural elements and of said tonneau cover.

19. The system of claim 18 wherein said control means controls the movements of said motive means based upon said indicated instantaneous position of said articulating structural element and said tonneau cover.

20. A system as set forth in claim 1, wherein said convertible top pivots with respect to an automobile, and wherein said position sensing means senses the position of said convertible top with respect to said automobile where said convertible top pivots.

21. A system as set forth in claim 20, wherein said position sensing means comprises a potentiometer.

22. A system as set forth in claim 20, wherein said convertible top further comprises at least two elements pivotally joined to form said convertible top, and wherein said position sensing means further senses the position of said elements with respect to each other.

23. A system as set forth in claim 22, wherein said position sensing means comprises a plurality of potentiometers, at least one said potentiometer mounted at each pivot point.

* * * * *

UNITED STATES PATENT AND TRADEMARK OFFICE
CERTIFICATE OF CORRECTION

PATENT NO. : 5,225,747
DATED : July 6, 1993
INVENTOR(S) : James M. Helms et al

It is certified that error appears in the above-indentified patent and that said Letters Patent is hereby corrected as shown below:

Column 3, line 57, after "chassis" insert -- ) --.

Column 3, line 67, "point" should be -- points --.

Column 4, line 1, "diagramatically" should be -- diagrammatically --.

Column 4, line 50, "interpretting" should be -- interpreting --.

Column 4, line 63, "mnenomic" should be -- mnemonic --.

Column 5, line 7, after "the" (first occurrence) insert -- automobile --.

Column 5, line 62, delete "the" (second occurrence).

Column 7, line 9, after "of" insert -- both --.

Signed and Sealed this

Eighth Day of March, 1994

Attest:

BRUCE LEHMAN

Attesting Officer    Commissioner of Patents and Trademarks